(12) United States Patent
Yoshioka et al.

(10) Patent No.: US 12,206,511 B2
(45) Date of Patent: Jan. 21, 2025

(54) USER TERMINAL

(71) Applicant: NTT DOCOMO, INC., Tokyo (JP)

(72) Inventors: Shohei Yoshioka, Tokyo (JP); Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 651 days.

(21) Appl. No.: 17/265,056

(22) PCT Filed: Aug. 2, 2018

(86) PCT No.: PCT/JP2018/029136
§ 371 (c)(1),
(2) Date: Feb. 1, 2021

(87) PCT Pub. No.: WO2020/026424
PCT Pub. Date: Feb. 6, 2020

(65) Prior Publication Data
US 2021/0314107 A1    Oct. 7, 2021

(51) Int. Cl.
*H04L 1/1867* (2023.01)
*H04L 1/1812* (2023.01)
(Continued)

(52) U.S. Cl.
CPC .......... *H04L 1/1896* (2013.01); *H04L 1/1819* (2013.01); *H04L 1/189* (2013.01); *H04W 72/0446* (2013.01); *H04W 72/23* (2023.01)

(58) Field of Classification Search
CPC ....... H04L 1/08; H04L 1/1812; H04L 1/1819; H04L 1/1854; H04L 1/1861; H04L 1/189;
(Continued)

(56) References Cited

U.S. PATENT DOCUMENTS

2009/0257408 A1* 10/2009 Zhang ................. H04L 5/0048
370/336
2015/0181576 A1* 6/2015 Papasakellariou .... H04L 1/0072
370/329
(Continued)

FOREIGN PATENT DOCUMENTS

JP    2017-509177 A    3/2017

OTHER PUBLICATIONS

MediaTek Inc.; "Timing of HARQ-ACK for PDSCH"; Agenda Item: 5.1.3.3.5.1 3GPP TSG RAN WG1 Meeting AH#2 Qingdao, China, Jun. 27-30, 2017 R1-1710795 (Year: 2017).*
(Continued)

*Primary Examiner* — Gary Mui
(74) *Attorney, Agent, or Firm* — Osha Bergman Watanabe & Burton LLP

(57) ABSTRACT

In order to appropriately control uplink control information even in a case of controlling repetition transmission by use of a plurality of pieces of downlink control information, a user terminal according to the present disclosure includes a receiving section that receives downlink shared channels repeatedly transmitted by use of a plurality of slots, and a control section that, in a case that transmissions of the downlink shared channels transmitted in the respective slots are controlled based on different pieces of downlink control information, controls transmissions of acknowledgment signals for the downlink shared channels repeatedly transmitted, using a resource specified by at least one piece of downlink control information.

3 Claims, 16 Drawing Sheets

(51) Int. Cl.
*H04W 72/0446* (2023.01)
*H04W 72/23* (2023.01)

(58) Field of Classification Search
CPC .. H04L 1/1896; H04W 72/0446; H04W 72/23
See application file for complete search history.

(56) References Cited

U.S. PATENT DOCUMENTS

| | | | |
|---|---|---|---|
| 2017/0005758 | A1 | 1/2017 | Baldemair et al. |
| 2018/0167170 | A1* | 6/2018 | Kim .................. H04L 1/189 |
| 2019/0020506 | A1* | 1/2019 | Cheng .................. H04L 1/007 |
| 2020/0008225 | A1* | 1/2020 | Lee .................. H04W 72/1273 |
| 2020/0015200 | A1* | 1/2020 | Vilaipornsawai ..... H04W 72/23 |
| 2020/0187177 | A1* | 6/2020 | Lee .................. H04L 1/08 |
| 2020/0196343 | A1* | 6/2020 | Marinier .............. H04L 5/0094 |
| 2020/0213980 | A1* | 7/2020 | Takeda .................. H04L 1/08 |
| 2021/0273752 | A1* | 9/2021 | Takeda .................. H04L 1/1896 |
| 2021/0297191 | A1* | 9/2021 | Takeda .................. H04L 1/1858 |
| 2021/0336726 | A1* | 10/2021 | Takeda .................. H04W 72/54 |

OTHER PUBLICATIONS

CATT; "Remaining issues on HARQ-ACK codebook"; Agenda Item: 7.1.3.4.2 3GPP TSG Ran WG1 Meeting #93 Busan, Korea, May 21-25, 2018 R1-1806301 (Year: 2018).*
International Search Report issued in Application No. PCT/JP2018/029136, dated Oct. 23, 2018 (5 pages).
Written Opinion issued in International Application No. PCT/JP2018/029136, dated Oct. 23, 2018 (4 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting #92bis; R1-1804531; "Discussion on blind/HARQ-less repetition for scheduled DL-SCH operation;" LG Electronics; Apr. 16-20, 2018; Sanya, China (5 pages).
3GPP TSG RAN WG1 Meeting #92bis; R1-1804341; "Discussion on blind/HARQ-less PDSCH repetition for URLLC;" Samsung; Apr. 16-20, 2018; Sanya, China (3 pages).
3GPP TSG RAN WG1 Meeting #93; R1-1806385; "On remaining details of blind/HARQ-less PDSCH repetition;" Nokia, Nokia Shanghai Bell; May 21-25, 2018; Busan, Republic of Korea (4 pages).

* cited by examiner

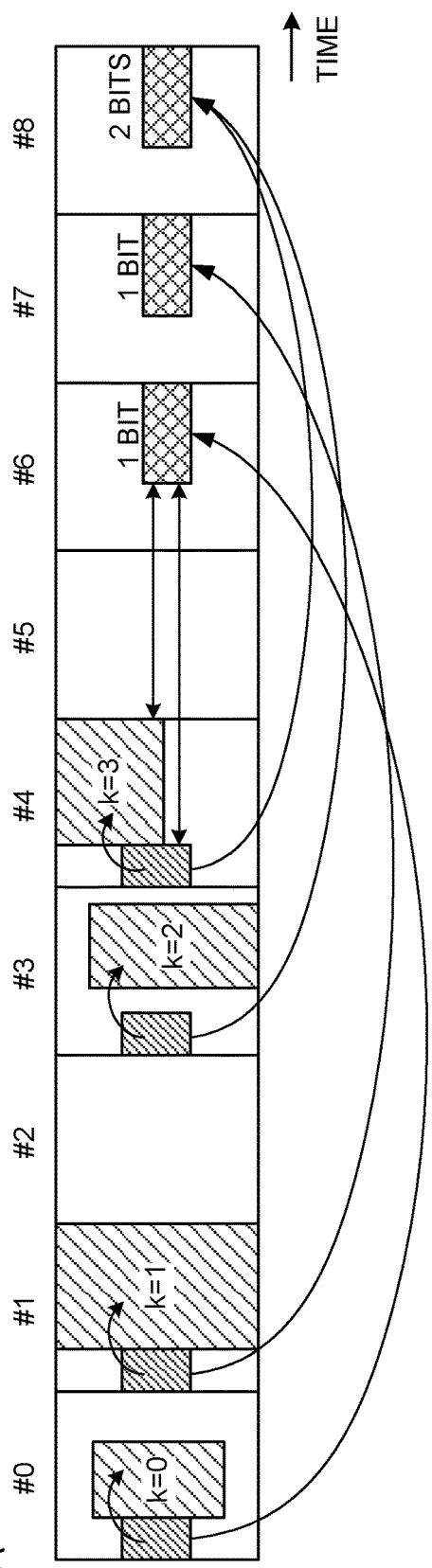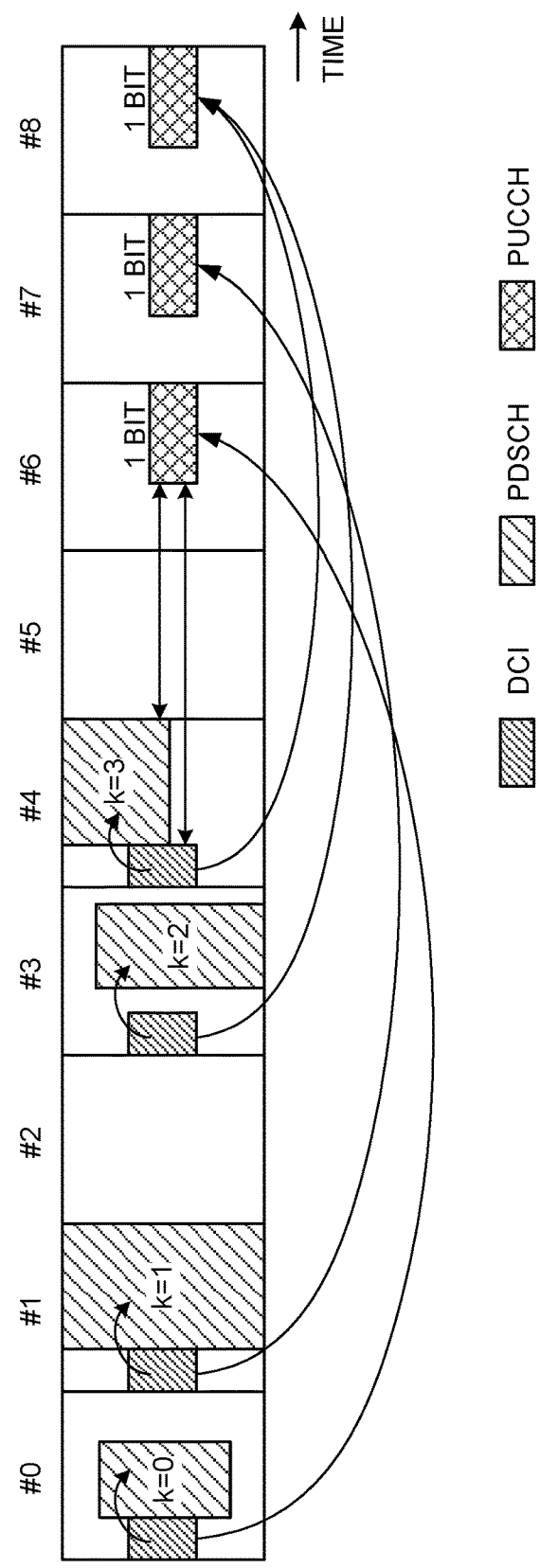

USER TERMINAL

TECHNICAL FIELD

The present disclosure relates to a user terminal in next-generation mobile communication systems.

BACKGROUND ART

In UMTS (Universal Mobile Telecommunications System) networks, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 14), a user terminal (UE (User Equipment)) controls reception of a downlink shared channel (for example, PDSCH (Physical Downlink Shared Channel)) based on downlink control information (DCI, also referred to as DL assignment and the like) transmitted on a downlink control channel (for example, PDCCH (Physical Downlink Control Channel)). In addition, the user terminal controls transmission of an uplink shared channel (for example, PUSCH (Physical Uplink Shared Channel)) based on the DCI (also referred to as a UL grant and the like).

In the existing LTE systems, downlink (DL) and uplink (UL) communications are carried out using 1 ms subframes (also referred to as "transmission time intervals (TTIs)" and the like). The subframe is a transmission time unit of one data packet coded by channel coding, and is a processing unit of scheduling, link adaptation and the retransmission control (HARQ (Hybrid Automatic Repeat Request)), and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR, 5G, 5G+, or Rel. 15 or later versions), a study is underway to repeatedly transmit at least one of a certain channel (for example, PDSCH, PUSCH, and the like) and a signal (channel/signal). The repetition transmission is considered to be useful to ultra-reliable and low-latency services, for example, URLLC (Ultra Reliable and Low Latency Communications) and the like.

For example, a base station uses one piece of downlink control information (for example, the DCI) to schedule (or repeatedly transmit) a downlink shared channel (for example, PDSCH) over a plurality of slots. In this case, the base station may use the DCI to notify a UE of a PDSCH transmission candidate region (also referred to as candidate occasion, PDSCH occasion, or allocation candidate region). A structure in which the PDSCH candidate occasion is configured over the plurality of slots is also referred to as PDSCH repetition transmission or multi-slot PDSCH transmission.

The UE receives the PDSCHs repeatedly transmitted from the base station, and transmits an acknowledgment signal for each PDSCH (for example, HARQ-ACK, ACK/NACK, A/N, and the like). The UE determines a feedback timing for the PDSCH based on the DCI and the like used to schedule the PDSCH.

On the other hand, from the perspective of flexibly controlling the PDSCH repetition transmission, a separate piece of DCI is assumed to be used for each PDSCH transmission for the scheduling. In this case, how to control transmission of the HARQ-ACK for the PDSCH is an issue. In a case that the HARQ-ACK is not appropriately fed back in the PDSCH repetition transmission, a communication quality may be deteriorated.

As such, the present disclosure has an object to provide a user terminal capable of appropriately controlling uplink control information even in a case of controlling repetition transmission by use of a plurality of pieces of downlink control information.

Solution to Problem

A user terminal according to an aspect of the present disclosure includes a receiving section that receives downlink shared channels repeatedly transmitted by use of a plurality of slots, and a control section that, in a case that transmissions of the downlink shared channels transmitted in the respective slots are controlled based on different pieces of downlink control information, controls transmissions of acknowledgment signals for the downlink shared channels repeatedly transmitted, using a resource specified by at least one piece of downlink control information.

Advantageous Effects of Invention

According to an aspect of the present disclosure, it is possible to appropriately control uplink control information even in a case that repetition transmission is controlled by use of a plurality of pieces of downlink control information.

BRIEF DESCRIPTION OF DRAWINGS

FIGS. 8A and 8B are diagrams to show another example of the HARQ-ACK transmission according to the second aspect;

DESCRIPTION OF EMBODIMENTS

For future radio communication systems (for example, NR, 5G, 5G+, or Rel. 15 or later versions), a study is underway to repeatedly transmit at least one of a channel and a signal (channel/signal). The channel/signal is, but not limited to, a PDSCH, a PDCCH, a PUSCH, a PUCCH, a DL-RS, an uplink reference signal (UL-RS), and the like, for example.

Figure 1:
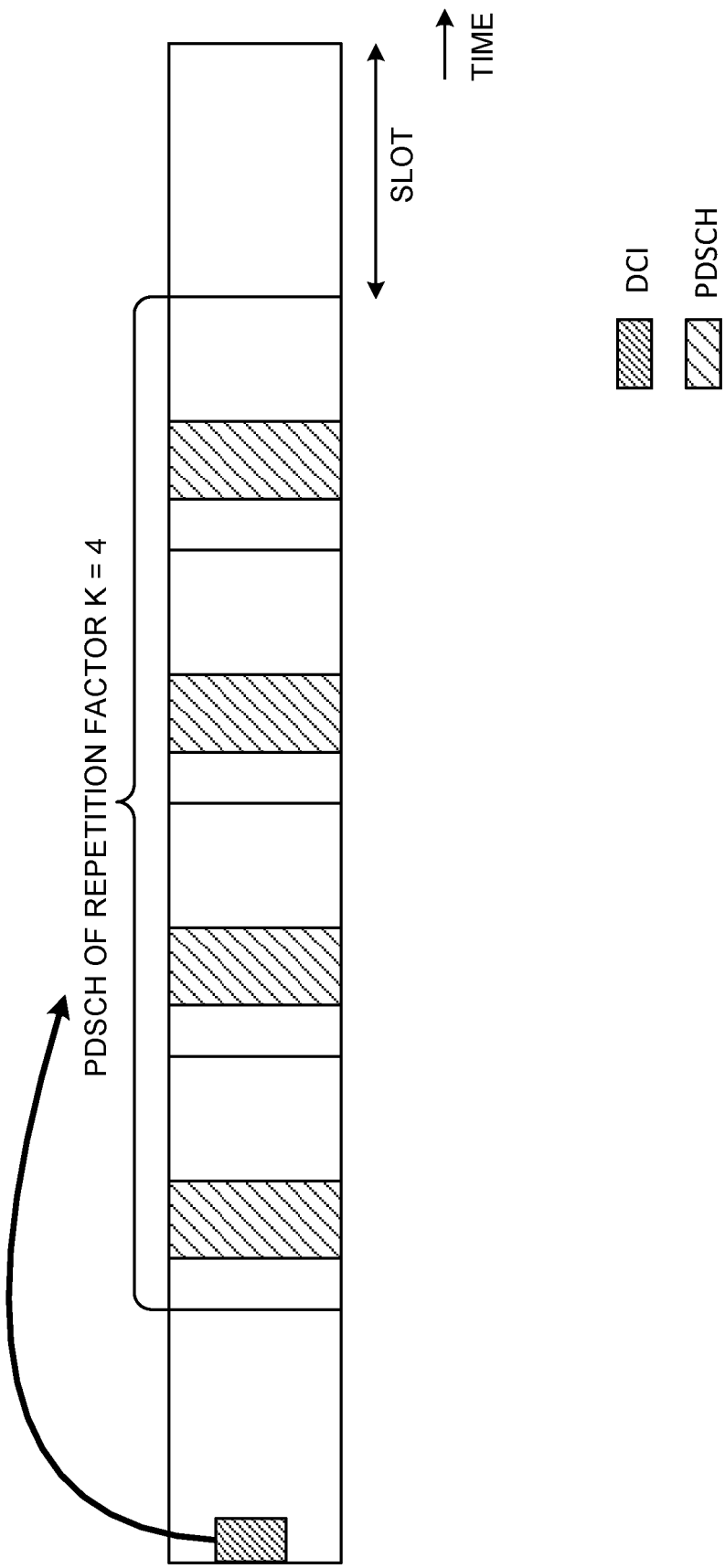
FIG. 1 is a diagram to show an example of PDSCH repetition transmission.

FIG. 1 is a diagram to show an example of PDSCH repetition transmission. FIG. 1 shows an example in which a certain number of repetitions of the PDSCH are scheduled by way of one piece of DCI. The number of repetitions is also referred to as a repetition factor K or an aggregation factor K. For example, the repetition factor K is K=4 in FIG. 1, bur a value of K is not limited thereto. The n-th repetition is also referred to as the n-th transmission occasion or the like, and may be identified by a repetition index k ($0 \leq k \leq K-1$).

For example, in FIG. 1, the user terminal receives information indicating the repetition factor K through higher layer layer signaling. Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CE), MAC PDUs (Protocol Data Units), and the like. For example, the broadcast information may be master information blocks (MIBs), system information blocks (SIBs), minimum system information (RMSI (Remaining Minimum System Information)), and the like.

As shown in FIG. 1, the user terminal detects the DCI scheduling the PDSCH that is repeatedly transmitted in a certain serving cell or a partial band within the certain serving cell (Bandwidth Part (BWP)). The BWP may include a BWP for the uplink (UL) (UL BWP, uplink BWP) and a BWP for the downlink (DL) (DL BWP, downlink BWP).

The user terminal may monitor a CORESET configured within the DL BWP (a set of one or more search spaces (SS set) associated with the CORESET or PDCCH candidates constituting the SS set) to detect the DCI. The user terminal receives the PDSCH in K continuous slots a certain period after from the slot in which the DCI is detected. Note that the serving cell is also referred to as a carrier, a component carrier (CC), a cell, or the like.

Specifically, the user terminal controls a PDSCH receiving process in K continuous slots (for example, at least one of receiving, demapping, demodulating, and decoding), based on at least one of field values described below (or information indicated by the field value) in the DCI described above:

Time domain resource (for example, start symbol, the number of symbols in each slot, and the like) allocation, Frequency domain resource (for example, the certain number of resource blocks (RB) and the certain number of resource block groups (RBG) allocation, Modulation and coding scheme (MCS) index, PDSCH demodulation reference signal (DMRS) configuration, and State of transmission configuration indication (or transmission configuration indicator) (TCI) (TCI-state).

The user terminal controls the PDSCH reception in each slot assuming that the time domain resources allocated to the PDSCH, the same frequency domain resources, the MCS indices, and the DMRS configurations are the same in K (K=4 in FIG. 1) continuous slots that are semi-statically configured through higher layer signaling. Specifically, the user terminal assumes that the field values described above in one piece of DCI are applied to all of K continuous slots.

On the other hand, the user terminal controls the PDSCH reception in each slot assuming that a redundancy version (RV) applied to the PDSCH is changed in a certain order (for example, $0 \to 2 \to 3 \to 1$) in the K continuous slots.

In NR, a study is underway also to more flexibly control the PDSCH repetition transmission. The repetition transmission may be performed using the same TCI-state (TRP), or the TCI-state (TRP) different per the certain number of repetitions (for example, 1 repetition).

The PDSCH may be repeated throughout at least one of continuous frequency domain resources and a discontinuous frequency band. Here, the frequency band may be at least one or more BWPs and one or more CCs, for example.

The PDSCH may be repeated throughout at least one of continuous time domain units and discontinuous time domain units. Here, the time domain unit may be one or more slots, for example.

At least one of the following items may be maintained to be the same between at least two repetitions of the PDSCH:

Transport block size (TBS), and

HARQ process number (HPN (Hybrid Automatic Repeat reQuest Process Number).

On the other hand, at least one of the following items may be different between at least two repetitions of the PDSCH:

Time domain resource allocated to PDSCH (for example, a PDSCH start symbol in a slot, the number of symbols allocated to a PDSCH in a slot, and the like), Frequency domain resource allocated to PDSCH (for example, the certain number of RBs or RBGs allocated to a PDSCH), MCS index for PDSCH, MIMO (Multi Input Multi Output) configuration (also referred to as the number of transport blocks (TBs), the number of layers, and the like), RV applied to PDSCH, The number of code block groups (CBGs) in one TB,
PUCCH resource used to transmit acknowledgment information for PDSCH (also referred to as HARQ-ACK (Hybrid Automatic Repeat reQuest-Acknowledge, ACK or NACK, A/N, and the like),
TPC command for PUCCH used to transmit HARQ-ACK,
HARQ-ACK feedback timing,
TCI-state, and
PDSCH DMRS sequence.

From the perspective of flexibly control allocation of each PDSCH repeatedly transmitted, at least two repetitions of the PDSCH may be scheduled by way of different pieces of DCI. For example, the respective repetitions of the PDSCH of the repetition factor K may be scheduled by way of different pieces of DCI (for example, K pieces of DCI), or some of the repetition may be scheduled by way of different pieces of DCI. DCI scheduling one repetition may be one piece of DCI, or a plurality of pieces of DCI (for example, two-step DCI).

Figure 2:
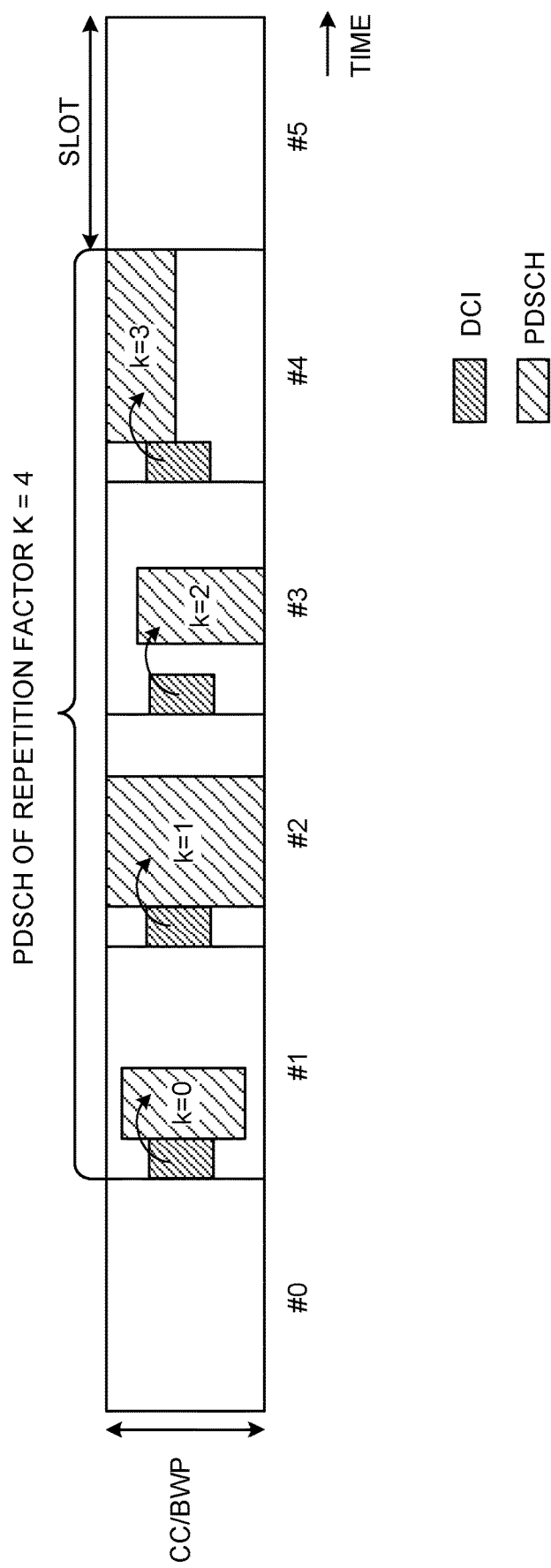
FIG. 2 is a diagram to show another example of the PDSCH repetition transmission.

FIG. 2 is a diagram to show an example of PDSCH flexible repetition transmission. FIG. 2 shows an example in which K repetitions of the PDSCH in the time domain are scheduled by way of K pieces of DCI, respectively. Note that K=4 in FIG. 2, but a value of K is not limited thereto. The repetition factor K may or may not be configured for the user terminal through higher layer signaling.

In FIG. 2, the PDSCH repetition transmission is performed in K continuous slots, but at least one of K slots may not be continuous. In FIG. 2, the PDSCH repetition transmission is performed in the same frequency band (for example, CC or BWP), but at least one of K frequency bands may be different. The respective repetitions may be transmitted from different TRPs (or may be in different TCI-states).

In FIG. 2, the user terminal monitors (blind-decodes) the PDCCH candidate (also referred to as a search space (SS) set including one or more SSs, or the like) configured in each slot. For example, in FIG. 2, the user terminal detects K pieces of DCI (here, four pieces of DCI) in K slots (here, #1 to #4) to control receptions of the PDSCHs of the repetition index k=0 to K−1 (here, k=0 to 3) scheduled by way of these K pieces of DCI, respectively.

As shown in FIG. 2, the frequency domain resource (for example, the number of RBs), the time domain resource (for example, the number of symbols), or the like that is allocated to the PDSCH may be different between at least two repetitions. Note that in FIG. 2, between the repetitions, positions of the PDSCH start symbols are the same, but the start symbol positions or the like may be different.

Figure 3:
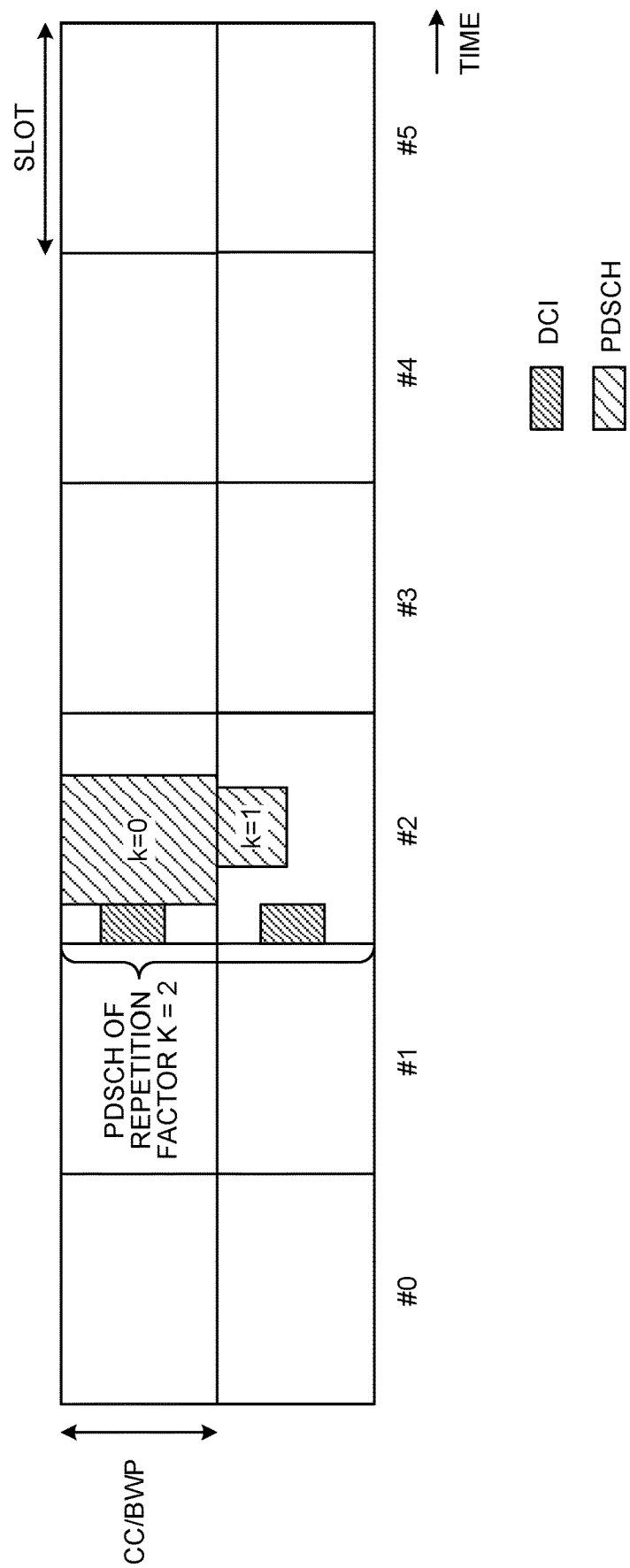
FIG. 3 is a diagram to show another example of the PDSCH repetition transmission.

FIG. 3 is a diagram to show another example of the PDSCH flexible repetition transmission. In FIG. 3, K repetitions are performed not in the time domain but in the frequency domain differently from in FIG. 2. In the following, differences from in FIG. 2 will be mainly described.

As shown in FIG. 3, the PDSCH repetition transmissions in K different frequency bands (for example, CCs or BWPs) may be scheduled by way of K pieces of DCI, respectively. For example, in FIG. 3, K=2 and the PDSCHs of the repetition index k=0, 1 are transmitted in two CCs or two BWPs. Note that the respective repetitions may be transmitted from different TRPs (or may be different TCI-states).

For example, in FIG. 3, the user terminal detects K pieces of DCI (here, two pieces of DCI) in a slot (here, slot #2) to control receptions of the PDSCHs of the repetition index k=0 to K−1 (here, k=0 to 1) scheduled by way of these K pieces of DCI, respectively.

The user terminal may be configured with one or more frequency bands (for example, a set of one or more CCs or BWPs (CC/BWP) (CC/BWP set)) for the PDSCH (TB) repetition transmission through higher layer signaling. One or more frequency bands in which the PDSCH (TB) is actually repeated may be at least some (subset) of the frequency bands configured for the user terminal.

A duration for the PDSCH (TB) repetition transmission (for example, one or more slots) may be predefined or configured through higher layer signaling for the user terminal. The duration may be a duration from an initial repetition to a last repetition of the PDSCH, or a duration from a PDCCH scheduling the PDSCH to the last repetition, for example.

In this manner, it is assumed that in a case of the repetition transmission of the channel/signal, a plurality of pieces of DCI are used to control allocations of the respective PDSCHs.

The UE receives the PDSCHs repeatedly transmitted from the base station, and transmits an acknowledgment signal for each PDSCH (for example, HARQ-ACK, ACK/NACK, A/N, and the like). The UE determines a feedback timing for the PDSCH, based on the DCI and the like used to schedule the PDSCH.

On the other hand, from the perspective of flexibly controlling the PDSCH repetition transmission, a separate piece of DCI is assumed to be used for each PDSCH transmission for the scheduling. For example, in a case that one piece of DCI is used to schedule the repetition transmission, an HARQ-ACK may be transmitted on a resource specified by the DCI (for example, at least one of a frequency resource and a time resource) (see FIG. 4).

Figure 4:
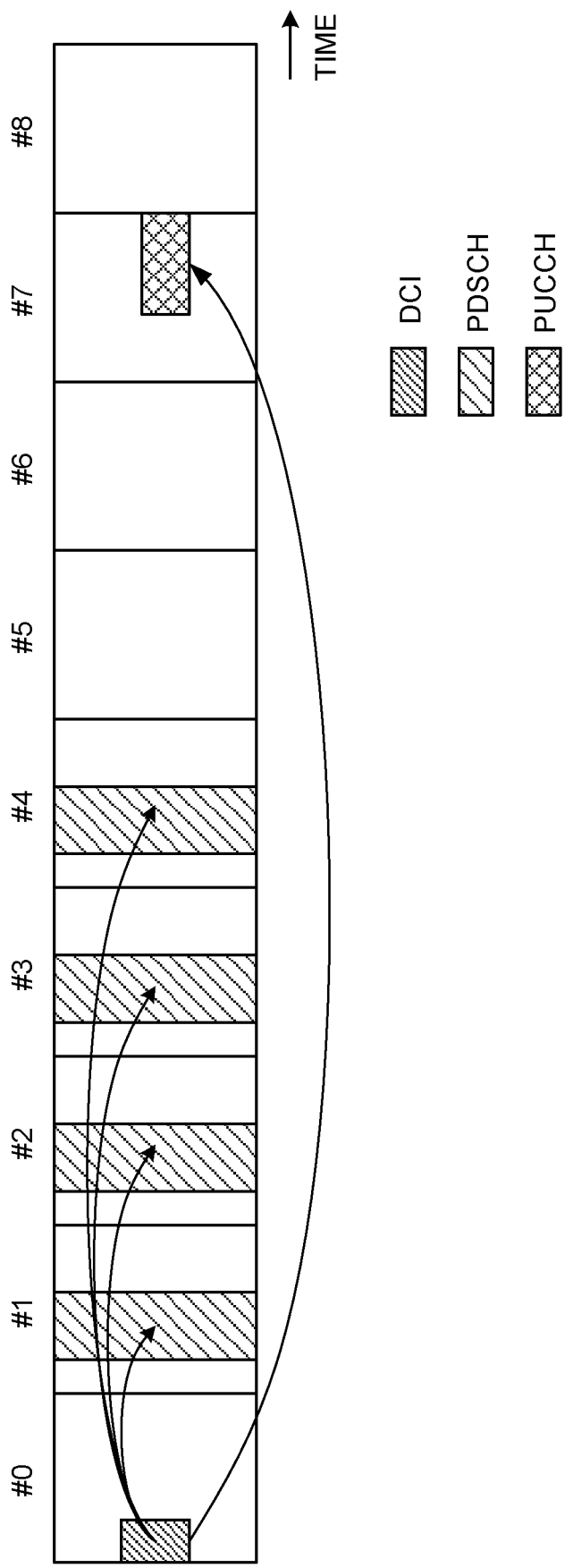
FIG. 4 is a diagram to show an example of HARQ-ACK feedback for PDSCHs repeatedly transmitted.

FIG. 4 shows a case that the DCI transmitted in slot #0 is used to schedule the PDSCH that is repeatedly transmitted through slots #1, #2, #3, and #4. In this case, the UE may determine a resource used to transmit the HARQ-ACK for each of the PDSCHs repeatedly transmitted (for example, transmission timing (for example, slot), PUCCH resource, or the like) based on information included in the DCI transmitted in slot #0.

On the other hand, in a case that a plurality of pieces of DCI are used to control the PDSCH repetition transmission (for example, in FIG. 2 or the like), how to control a transmission process of the HARQ-ACKs for the PDSCHs repeatedly transmitted (for example, transmission timing, PUCCH resource, or the like) is an issue. In a case that the HARQ-ACK is not appropriately fed back in the PDSCH repetition transmission, a communication quality may be deteriorated.

As such, the inventors of the present invention came up with the idea of using a resource notified by way of a certain DCI to control HARQ-ACK transmission in the case that the PDSCH transmission that is repeatedly transmitted through a plurality of slots is controlled based on one or more pieces of DCI.

Hereinafter, the present embodiment will be described with reference to the drawings. In the following description, reception of a PDSCH (for example, DL data) and an HARQ-ACK for the PDSCH are described, but a signal or a channel to which the present embodiment is applicable is not limited thereto. In the following description, the PDSCH (or PUSCH) being repeatedly transmitted through a plurality of slots may be interpreted as a transmission candidate region for the PDSCH (or PUSCH) being configured through a plurality of slots.

The following description is given, as an example, of a case that the number of PDSCH repetition transmissions (also referred to as a repetition factor K (aggregationFactorDL)) is four, but the repetition factor may not be limited to four and may be another value. The repetition transmission may be performed by use of continuous slots or discontinuous slots. The following description shows a case that the HARQ-ACK is multiplexed on the PUCCH resource, but may be similarly applicable to a case of multiplexing on the PUSCH. The following description is similarly applicable to uplink control information other than the HARQ-ACK (for example, CSI, SR, and the like).

(First Aspect)

A first aspect describes a case that HARQ-ACKs for PDSCHs repeatedly transmitted through a plurality of slots (for example, k=0 to 3) based on a repetition factor K (for example, K=4) are collectively transmitted.

Figure 5:
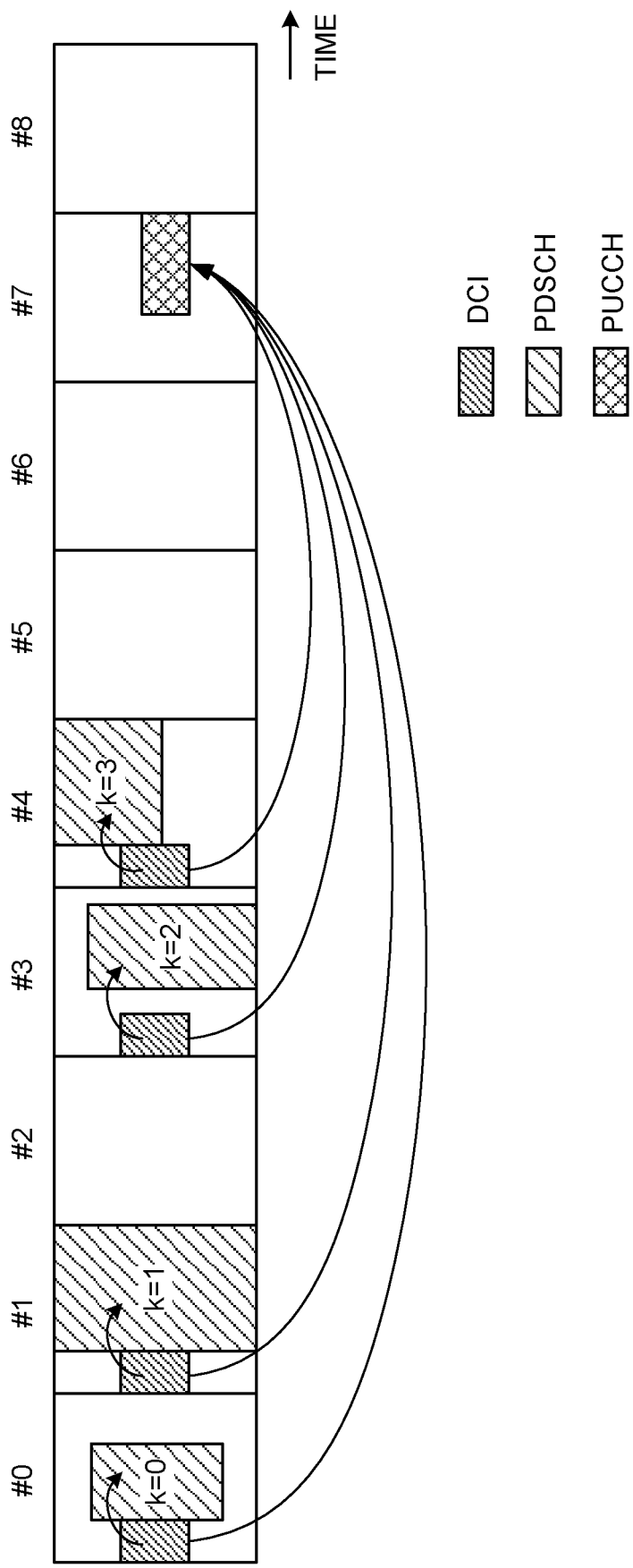
FIG. 5 is a diagram to show an example of an HARQ-ACK transmission according to a first aspect.

FIG. 5 is a diagram to show an example of the PDSCH repetition transmission. FIG. 5 shows an example in which K (K=4, here) repetitions of the PDSCH in the time domain are scheduled by way of K pieces of DCI, respectively. FIG. 5 shows a case that a plurality of slots #0, #1, #3, and #4 are used to repeatedly transmit the PDSCH.

In FIG. 5, the PDSCH repetition transmission is performed in the same frequency band (for example, CC or BWP), but at least one of K frequency bands may be different. The respective repetitions may be transmitted from different TRPs (or may be in different TCI-states).

In FIG. 5, the UE monitors the PDCCH candidate (also referred to as a search space (SS) set including one or more SSs, or the like) configured in each slot. For example, in FIG. 5, the UE detects K pieces of DCI in slot #0, #1, #3, and #4 to control receptions of K PDSCHs of which allocations are controlled by the K pieces of DCI, respectively.

Here, a case is shown that K PDSCHs are indexed by repetition indices k=0 to K−1 (k=0 to 3, here), and allocations of PDSCHs with different indices are controlled by different pieces of DCI. For example, allocation of the PDSCH with the repetition index k=0 may be controlled by DCI #0, allocation of the PDSCH with the repetition index k=1 may be controlled by DCI #1, allocation of the PDSCH with the repetition index k=2 may be controlled by DCI #2, and allocation of the PDSCH with the repetition index k=3 may be controlled by DCI #3.

Note that as shown in FIG. 5, the frequency domain resource (for example, the number of RBs), the time domain resource (for example, the number of symbols), or the like that is allocated to the PDSCH may be different between at least two repetitions.

The UE collectively transmits HARQ-ACKs for the PDSCHs repeatedly transmitted. For example, the UE controls in such a way to aggregate and transmit the HARQ-ACKs for the PDSCHs repeatedly transmitted (for example, in 1-bit). Specifically, the UE feeds back one HARQ-ACK for a series of PDSCH repetition transmissions (K repetition transmissions) to the base station.

FIG. 5 shows a case that the HARQ-ACKs for the PDSCHs repeatedly transmitted in slot #0, #1, #3, and #4 (or configured with the transmission candidate region) are aggregated (for example, in 1-bit) and transmitted in slot #7.

In this case, the UE may apply soft combining (or joint decoding) to a plurality of PDSCHs repeatedly transmitted (for example, a plurality of identical TBs) to perform the repetition process. This can reduce PDSCH reception failure and improve a probability that an ACK can be fed back. As a result, a process such as a retransmission process is not necessary, and thus, communication throughput can be improved.

The UE may transmit the aggregated HARQ-ACKs using a resource specified by at least one piece of DCI among a plurality of pieces of DCI for controlling scheduling of the respective PDSCHs. For example, the base station may notify the UE of the DCI including at least one of information about an HARQ-ACK feedback timing and information about a UL channel resource used to transmit an HARQ-ACK.

The information about the HARQ-ACK feedback timing (for example, PDSCH-to-HARQ_feedback timing indicator) may be information indicating the time domain for transmitting the HARQ-ACK, and may be a slot for transmitting the HARQ-ACK. For example, the information indicating the slot for transmitting the HARQ-ACK included in certain DCI may be information indicating a value (for example, offset value) from a PDSCH of which allocation is controlled by the certain DCI (for example, PDSCH transmitted last in the time direction) to the slot for transmitting the HARQ-ACK.

The information about the UL channel resource used to transmit the HARQ-ACK (for example, PUCCH resource indicator) may be information indicating an uplink control channel resource used to transmit the HARQ-ACK (for example, PUCCH resource).

A plurality of pieces of DCI respectively controlling allocations of the PDSCHs repeatedly transmitted (for example, identical PDSCHs or identical TBs) may include information specifying the same slot as the feedback timing for the PUCCH (for example, HARQ-ACK). The base station may control such that the HARQ-ACK feedback timing information included in the respective pieces of DCI transmitted in slots #0, #1, #3, and #4 specify the same slot (slot #7 in FIG. 5).

In this case, the UE may perform the transmission process of the HARQ-ACK assuming that a plurality of pieces of DCI controlling the PDSCH repetition transmission specify the same slot (slot #7, here) as the HARQ-ACK feedback timing.

A plurality of pieces of DCI respectively controlling allocations of the PDSCHs repeatedly transmitted may include information specifying the same PUCCH resource as a resource applied for the PUCCH (for example, HARQ-ACK) transmission. The base station may control such that the respective pieces of DCI transmitted in slots #0, #1, #3, and #4 specify the same PUCCH resource.

In this case, the UE may perform the transmission process of the HARQ-ACK assuming that a plurality of pieces of DCI controlling the PDSCH repetition transmission specify the same PUCCH as a resource used for the HARQ-ACK feedback.

The UE may control the transmission of the HARQ-ACK using a resource specified by certain DCI among a plurality of pieces of DCI for controlling scheduling of the respective PDSCHs. For example, the UE may determine a resource transmitting the HARQ-ACK based on information specified by DCI transmitted last (or the latest DCI) in the time direction among a plurality of pieces of DCI controlling the PDSCH repetition transmission. The certain DCI is not limited to the DCI transmitted last in the time direction, and may be another piece of DCI.

Specifically, the UE controls the HARQ-ACK transmission based on at least one of the information about the HARQ-ACK feedback timing (for example, slot) included in the certain DCI and the information about the PUCCH resource used to transmit the HARQ-ACK.

For example, assume a case that while a plurality of pieces of DCI controlling the PDSCH repetition transmission specify the same slot as the HARQ-ACK feedback timing, different PUCCH resources are specified as resources to be applied. In this case, the UE may decide the PUCCH resource, based on the last transmitted DCI (DCI #3 in slot #4 in FIG. 5).

Figure 6:
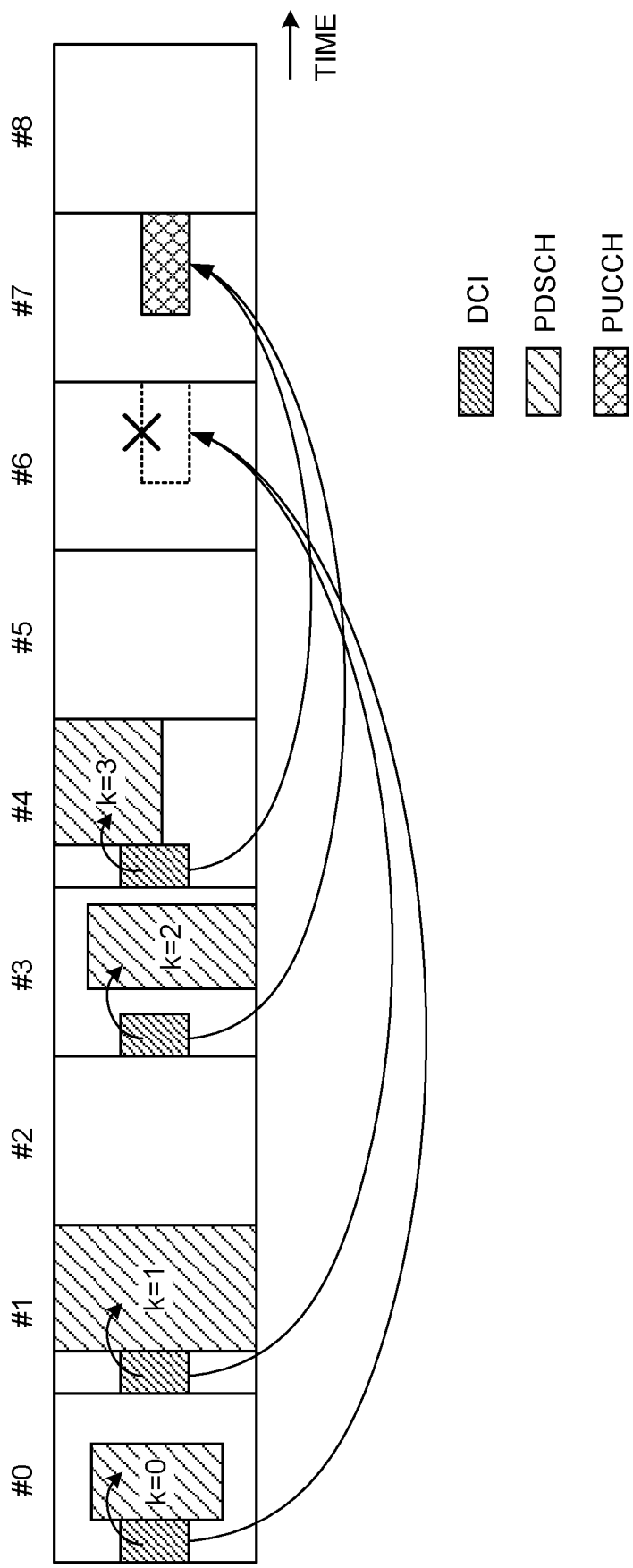
FIG. 6 is a diagram to show another example of the HARQ-ACK transmission according to the first aspect.

Assume a case that a plurality of pieces of DCI controlling the PDSCH repetition transmission specify different slots as the HARQ-ACK feedback timings (see FIG. 6). FIG. 6 shows a case that DCI #0 and DCI #1 specify slot #6 as the HARQ-ACK feedback timing, and DCI #2 and DCI #3 specify slot #7 as the HARQ-ACK feedback timing. In this case, the UE may decide the HARQ-ACK transmission timing and the PUCCH resource, based on the last transmitted DCI (DCI #3 in slot #4 in FIG. 6).

In this way, by controlling the HARQ-ACK feedback based on the information included in a certain DCI, the feedback of the aggregated HARQ-ACKs can be appropriately controlled even in a case that a plurality of pieces of DCI controlling the PDSCH repetition transmission are present.

(Second Aspect)

A second aspect describes a case that feedback of HARQ-ACKs for PDSCHs repeatedly transmitted through a plurality of slots based on a repetition factor K (for example, K=4) are controlled using resources specified by a plurality of pieces of DCI, respectively.

The UE may control in such a way to transmit the HARQ-ACKs for the PDSCHs repeatedly transmitted, using resources specified by the DCI controlling allocations of the respective PDSCHs. In this case, the UE may configure such that contents of the HARQ-ACKs to feed back using the resources (for example, a certain slot and a certain PUCCH resource) specified by the respective pieces of DCI are common (for example, have the same value) to control the HARQ-ACK transmission. Alternatively, the UE may configure such that the contents of the HARQ-ACKs to feed back using the resources specified by the respective pieces of DCI are different from each other to control the HARQ-ACK transmission.

Hereinafter, a description is given of an HARQ-ACK transmission control 1 for controlling such that the contents of the HARQ-ACKs to feed back using the resources specified by the respective pieces of DCI are common (for example, have the same value) and an HARQ-ACK transmission control 2 for controlling such that the contents of the HARQ-ACKs to feed back using the resources specified by the respective pieces of DCI are different from each other.

<HARQ-ACK Transmission Control 1>

Figure 7:
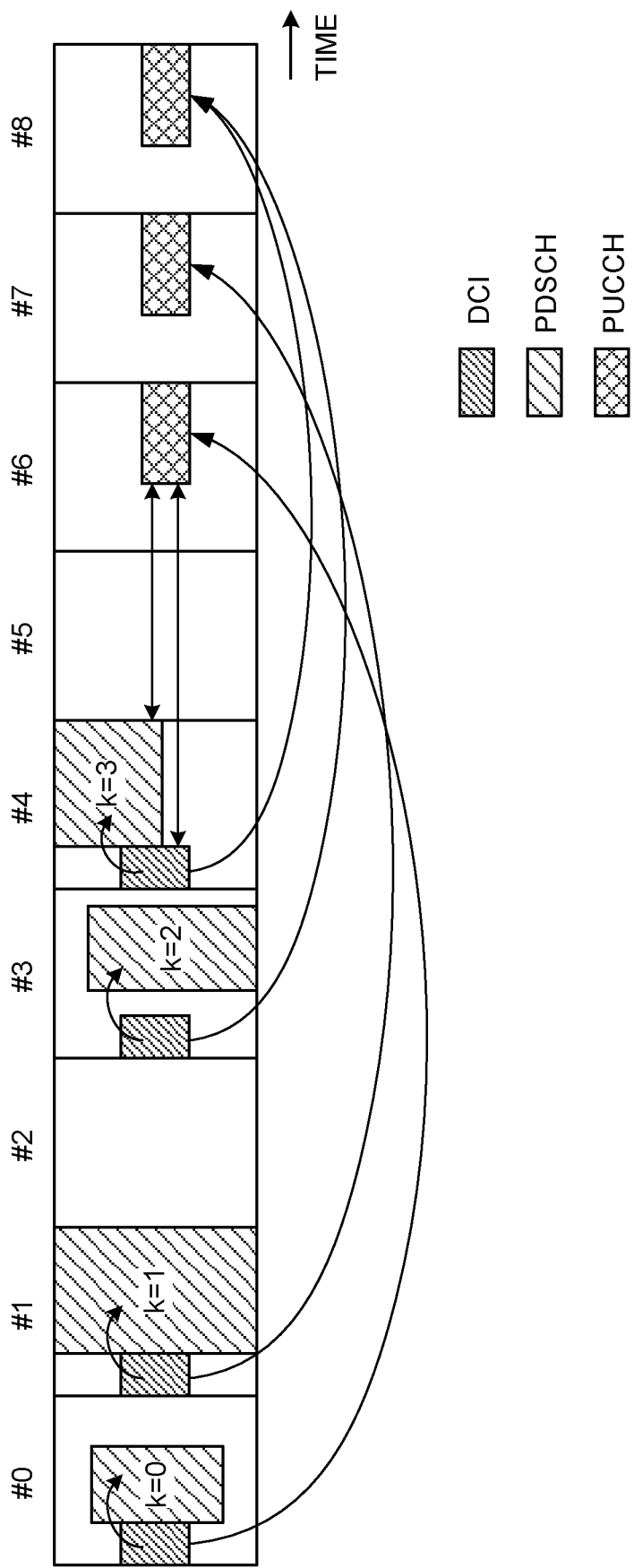
FIG. 7 is a diagram to show an example of an HARQ-ACK transmission according to a second aspect.

FIG. 7 is a diagram to show an example of HARQ-ACK transmission in a case that the HARQ-ACK transmission control 1 is applied. FIG. 7 shows a case that a plurality of slots #0, #1, #3, and #4 are used to repeatedly transmit the PDSCH K times based on K pieces of DCI (K=4, here). Note that the number of pieces of DCI may be configured to be different from the number of PDSCH repetitions.

In FIG. 7, the UE detects K pieces of DCI in slot #0, #1, #3, and #4 to control receptions of K PDSCHs of which allocations are controlled by the K pieces of DCI, respectively. Here, a case is shown that K PDSCHs are indexed by repetition indices k=0 to K−1 (k=0 to 3, here), and allocations of PDSCHs with different indices are controlled by different pieces of DCI.

For example, allocation of the PDSCH with the repetition index k=0 may be controlled by DCI #0, allocation of the PDSCH with the repetition index k=1 may be controlled by DCI #1, allocation of the PDSCH with the repetition index k=2 may be controlled by DCI #2, and allocation of the PDSCH with the repetition index k=3 may be controlled by DCI #3.

Information about the resources (for example, a slot and a PUCCH resource for feeding back the HARQ-ACK) used for the HARQ-ACK transmission, the information being included in the plurality of pieces of DCI #0 to #3, may be configured independently from each other piece. Specifically, the resources specified by the respective pieces of DCI and used for the HARQ-ACK transmission may be the same or different from each other.

FIG. 7 shows a case that as the resources for transmitting the PUCCH (for example, HARQ-ACK), the DCI transmitted in slot #0 specifies a PUCCH resource in slot #6, the DCI transmitted in slot #1 specifies a PUCCH resource in slot #7, and the DCI transmitted in slots #3 and #4 specifies a PUCCH resource in slot #8.

The UE uses the respective PUCCH resources in the different slots to transmit the common HARQ-ACK (for example, one of ACK and NACK). For example, in a case the UE successfully receives the PDSCHs repeatedly transmitted, the UE transmits ACKs using the resources in the respective different slots. In a case the UE fails to receive the PDSCHs repeatedly transmitted, the UE transmits NACKs using the resources in the respective different slots.

In this case, the UE may determine the content of the HARQ-ACK based on the reception of the all PDSCHs repeatedly transmitted (PDSCHs of k=0 to 3 in FIG. 7), the UE may transmit the HARQ-ACK having the same content using a plurality of PUCCH resources. Note that the UE may decide the contents of the HARQ-ACKs for the PDSCHs repeatedly transmitted based on a result obtained by joint decoding (or soft combining) the PDSCH repetition transmission.

In this case, the UE uses a plurality of slots to repeatedly transmit a UL channel (for example, PUCCH) including the HARQ-ACK having the same content. This can improve an HARQ-ACK reception success probability in the base station.

In a case that an HARQ-ACK is generated based on a result of the receiving process of the all PDSCHs repeatedly transmitted, allocation of a resource for transmitting the HARQ-ACK (or a transmission timing of the HARQ-ACK) may be controlled to meet a certain condition.

For example, at least a first certain period is configured between a PDSCH that is transmitted last in the time direction among the PDSCHs repeatedly transmitted and a resource (for example, PUCCH) that is allocated initially in the time direction among the resources specified by the DCI. Alternatively, at least a second certain period is configured between a PDCCH (or DCI) that is transmitted last in the time direction among a plurality of pieces of DCI controlling transmission of the PDSCHs repeatedly transmitted and a resource (for example, PUCCH) that is allocated initially in the time direction among the resources specified by the DCI (see FIG. 7).

In FIG. 7, at least the first certain period is configured between a PDSCH in slot #4 that is transmitted last in the time direction among the PDSCHs repeatedly transmitted and a resource in slot #6 that is configured by DCI #0 initially in the time direction. Alternatively, at least the second certain period is configured between a PDCCH (or DCI) in slot #4 that is transmitted last in the time direction and a resource in slot #6 that is configured by DCI #0 initially in the time direction.

At least one of the first certain period and the second certain period may be configured based on reception processing capability of the UE or minimum reception processing capability required by the UE. The first certain period and the second certain period configured based on the reception processing capability of the UE or the minimum reception processing capability required by the UE may be referred to as a timeline requirement period.

The reception processing capability of the UE may be a period required for a receiving process for the PDSCH (for example, decoding or the like), or a period required after receiving the PDSCH until performing a transmission process of the HARQ-ACK (for example, generating the HARQ-ACK or the like). The UE may notify the base station of at least one of the first certain period and the second certain period as the UE capability.

The base station controls such that a resource for the HARQ-ACK for the repetition transmission is configured at a timing that is at least a certain period after from the PDSCH to transmit last in the repetition transmission. Specifically, the base station configures, as a resource for the HARQ-ACK transmission specified by the DCI, a value to be a timing that is at least a certain period after from the PDSCH to transmit last.

The UE may assume that the HARQ-ACK feedback timing (for example, resource for the HARQ-ACK transmission) notified by the DCI is configured to be a timing that is a certain period after from the PDSCH or PDCCH last transmitted.

The certain period is provided between the last received PDSCH and the resource for the HARQ-ACK transmission so that a time can be ensured for the UE to generate an HARQ-ACK depending on a result of joint decoding (or soft combining) the PDSCHs transmitted in a plurality of slots.

In this way, the transmission timing of the HARQ-ACK is controlled based on the reception processing capability of the UE and the transmission timing of the last received PDSCH or PDCCH so that increase in a UE processing load can be suppressed and an accurate HARQ-ACK can be transmitted.

In a case that the resources for the HARQ-ACKs for the PDSCHs repeatedly transmitted K times are specified by a plurality of (for example, K) pieces of DCI, respectively, the UE may control in such a way to feed back K-bit HARQ-ACK. For example, the UE may control in such a way to feed back 1-bit HARQ-ACK for each of the resources specified by the respective pieces of DCI.

In FIG. 8A, the UE may control in such a way to transmit 1-bit HARQ-ACK using a resource in slot #6, transmit 1-bit HARQ-ACK using a resource in slot #7, and transmit 2-bit HARQ-ACK using a resource in slot #8. This allows the PUCCH (for example, HARQ-ACK) to be repeatedly transmitted using the PUCCH resources specified by the respective pieces of DCI.

Alternatively, in a case that the UE receives different pieces of DCI specifying the same slot as the HARQ-ACK feedback timing, the UE may control in such a way to aggregate and transmit the HARQ-ACKs corresponding to the different pieces of DCI (for example, in 1-bit).

In FIG. 8B, DCI #2 transmitted in slot #3 and DCI #3 transmitted in slot #4 specify the same slot (slot #8, here) as a transmission slot for the HARQ-ACK. In this case, the UE may aggregate an HARQ-ACK corresponding to DCI #2 and an HARQ-ACK corresponding to DCI #3 in slot #8 to be fed back in 1-bit.

In a case that a PUCCH resource specified by DCI #2 is different from a PUCCH resource specified by DCI #3, the PUCCH resource specified by any one of the DCI (for example, the DCI transmitted later in the time direction) may be used to transmit 1-bit HARQ-ACK.

Alternatively, in a case that the UE receives different pieces of DCI specifying the same slot and the same PUCCH resource in the slot as the HARQ-ACK feedback timings, the UE may control in such a way to aggregate and transmit the HARQ-ACKs corresponding to the different pieces of DCI (for example, in 1-bit).

In FIG. 8B, DCI #2 transmitted in slot #3 and DCI #3 transmitted in slot #4 specify the same slot (slot #8, here) as a transmission slot for the HARQ-ACK. In this case, in a case that DCI #2 and DCI #3 specify the same PUCCH resource in slot #8, the UE may aggregate an HARQ-ACK corresponding to DCI #2 and an HARQ-ACK corresponding to DCI #3 to feed back the HARQ-ACKs in 1-bit.

In the case that the PUCCH resource specified by DCI #2 is different from the PUCCH resource specified by DCI #3, the UE may transmit 1-bit HARQ-ACK using the respective PUCCH resources without aggregating HARQ-ACKs.

The UE may decide the PUCCH resource based on at least one of information notified by DCI (for example, PUCCH resource indicator) and a control channel element (CCE) index. For example, the PUCCH resource may be decided based on a CCE index corresponding to the downlink control information and a certain expression defined in specifications.

In this way, by aggregating the HARQ-ACKs corresponding to a plurality of pieces of DCI specifying the same slot or the PUCCH resource in the same slot as the resource for the HARQ-ACK transmission, increase in overhead can be suppressed.

<HARQ-ACK Transmission Control 2>

Figure 9:
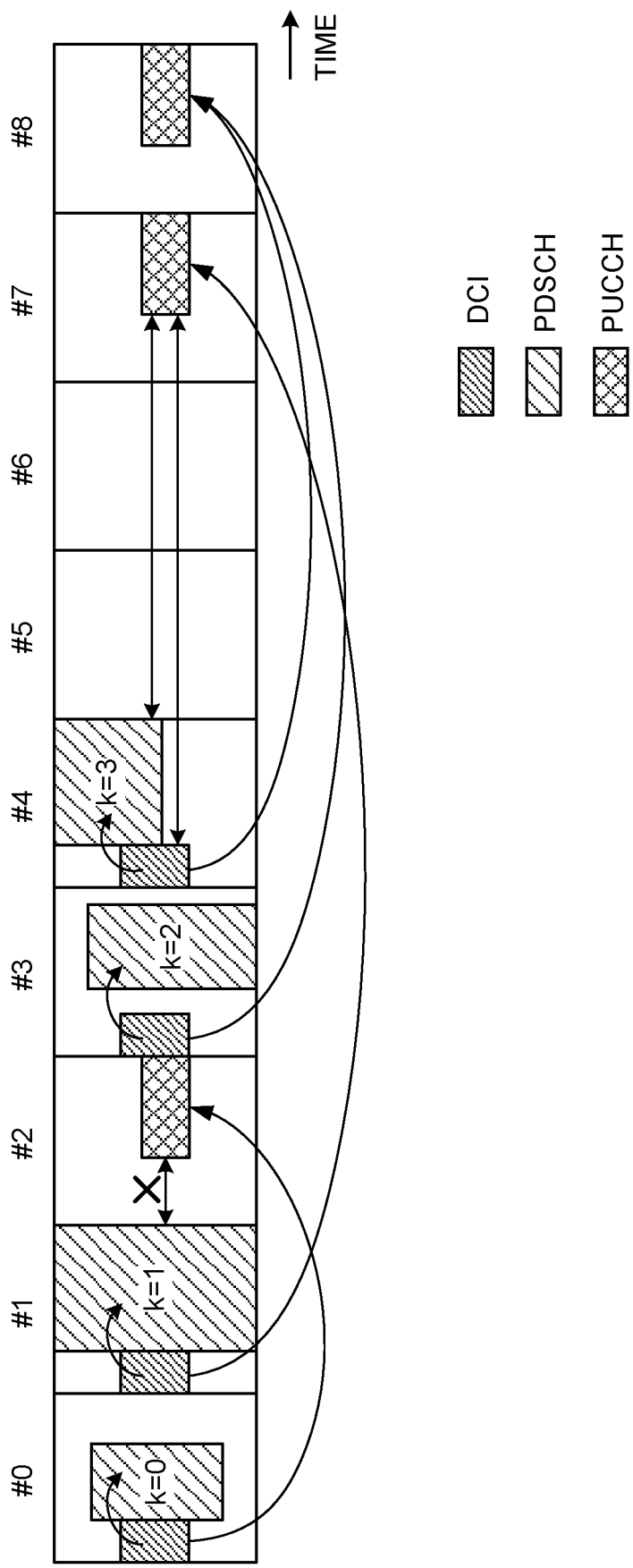
FIG. 9 is a diagram to show another example of the HARQ-ACK transmission according to the second aspect.

FIG. 9 is a diagram to show an example of HARQ-ACK transmission in a case that the HARQ-ACK transmission control 2 is applied. In the HARQ-ACK control 2, it is allowed to transmit the HARQ-ACKs having different contents using the resources specified by DCI. For this reason, the UE may transmit the HARQ-ACKs before receiving the all PDSCHs repeatedly transmitted (or completing receptions).

FIG. 9 shows a case that a plurality of slots #0, #1, #3, and #4 are used to repeatedly transmit the PDSCH K times based on K pieces of DCI (K=4, here). Note that the number of pieces of DCI may be configured to be the same as the number of PDSCH repetitions.

In FIG. 9, the UE detects K pieces of DCI in slot #0, #1, #3, and #4 to control receptions of K PDSCHs of which allocations are controlled by the K pieces of DCI, respectively. Here, a case is shown that K PDSCHs are indexed by repetition indices k=0 to K−1 (k=0 to 3, here), and allocations of PDSCHs with different indices are controlled by different pieces of DCI.

Information about the resources (for example, a slot and a PUCCH resource for feeding back the HARQ-ACK) used for the HARQ-ACK transmission, the information being included in the plurality of pieces of DCI #0 to #3, may be configured independently from each other piece. Specifically, the resources specified by the respective pieces of DCI and used for the HARQ-ACK transmission may be the same or different from each other.

FIG. 9 shows a case that as the resources for transmitting the PUCCH (for example, HARQ-ACK), the DCI transmitted in slot #0 specifies a resource in slot #2, the DCI transmitted in slot #1 specifies a resource in slot #7, and the DCI transmitted in slots #3 and #4 specifies a resource in slot #8.

The UE uses the resources configured in the different slots to transmit the respective HARQ-ACKs. The contents of HARQ-ACKs transmitted using the resources in the different slots may be the same or different. Specifically, the contents of the HARQ-ACKs transmitted using the respective resources may be independently decided.

For example, in a case that the UE transmits the HARQ-ACK using a PUCCH resource in a slot, the UE transmits the HARQ-ACK the content of which is determined based on a result of the receiving process (for example, decoding or the like) of a PDSCH received until a certain period before the PUCCH resource in the slot. The certain period may be a period configured based on the reception processing capability of the UE or the minimum reception processing capability required by the UE (for example, timeline requirement period).

Assume a case that in FIG. 9, the UE transmits the HARQ-ACK using the PUCCH resource in slot #2. In this case, since an interval between the PDSCH in slot #1 and the PUCCH resource in slot #2 is shorter than the certain period, the UE transmits an HARQ-ACK generated based on a result of receiving the PDSCH received in slot #0, using the PUCCH resource in slot #2. Specifically, the UE transmits the HARQ-ACK generated without considering the PDSCH received in slot #1.

Next, assume a case that the UE transmits the HARQ-ACK using the PUCCH resource in slot #7. In this case, since an interval between the PDSCH in slot #4 and the PUCCH resource in slot #7 is longer than the certain period, the UE transmits an HARQ-ACK generated based on a result of receiving the PDSCHs received in slots #0, #1, #3, and #4, using the resource in slot #7. Specifically, the UE transmits the HARQ-ACK generated in consideration of the PDSCHs received in slots #0, #1, #3, and #4.

In this case, the UE may transmit the HARQ-ACK generated depending on a result of joint decoding (or soft combining) the PDSCHs received in slots #0, #1, #3, and #4.

Similarly, in also a case that the UE transmits the HARQ-ACK using the PUCCH resource in slot #7, the HARQ-ACK generated depending on a result of joint decoding (or soft combining) the PDSCHs received in slots #0, #1, #3, and #4 may be transmitted.

In this way, by using the PUCCH resource in the slot later in the time direction, the HARQ-ACK can be generated (or the content of the HARQ-ACK can be determined) based on the result of receiving more PDSCHs. In a case that the UE uses a PUCCH resource in a certain slot, the UE can generate the HARQ-ACK by joint decoding the PDSCHs received until a certain period before the PUCCH resource.

Accordingly, content of an HARQ-ACK bit is updated (for example, changed from NACK to ACK at a certain timing) depending on the joint decoding. Note that the update of the HARQ-ACK bit may be controlled on the UE side in accordance with a certain rule.

In a case that the resources for the HARQ-ACKs for the PDSCHs repeatedly transmitted K times are specified by a plurality of (for example, K) pieces of DCI, respectively, the UE may control in such a way to feed back K-bit HARQ-ACK. For example, the UE may control in such a way to feed back 1-bit HARQ-ACK for each of the resources specified by the respective pieces of DCI.

In FIG. 9, the UE may control in such a way to transmit 1-bit HARQ-ACK using the resource in slot #2, transmit 1-bit HARQ-ACK using the resource in slot #7, and transmit 2-bit HARQ-ACK using the resource in slot #8. This allows the PUCCH (for example, HARQ-ACK) to be repeatedly transmitted using the PUCCH resources specified by the respective pieces of DCI.

Alternatively, in a case that the UE receives different pieces of DCI specifying the same slot, or the same slot and the same PUCCH resource as the HARQ-ACK feedback timings, the UE may control in such a way to aggregate the HARQ-ACKs corresponding to the different pieces of DCI and transmit the HARQ-ACKs (for example, in 1-bit).

Figure 10:
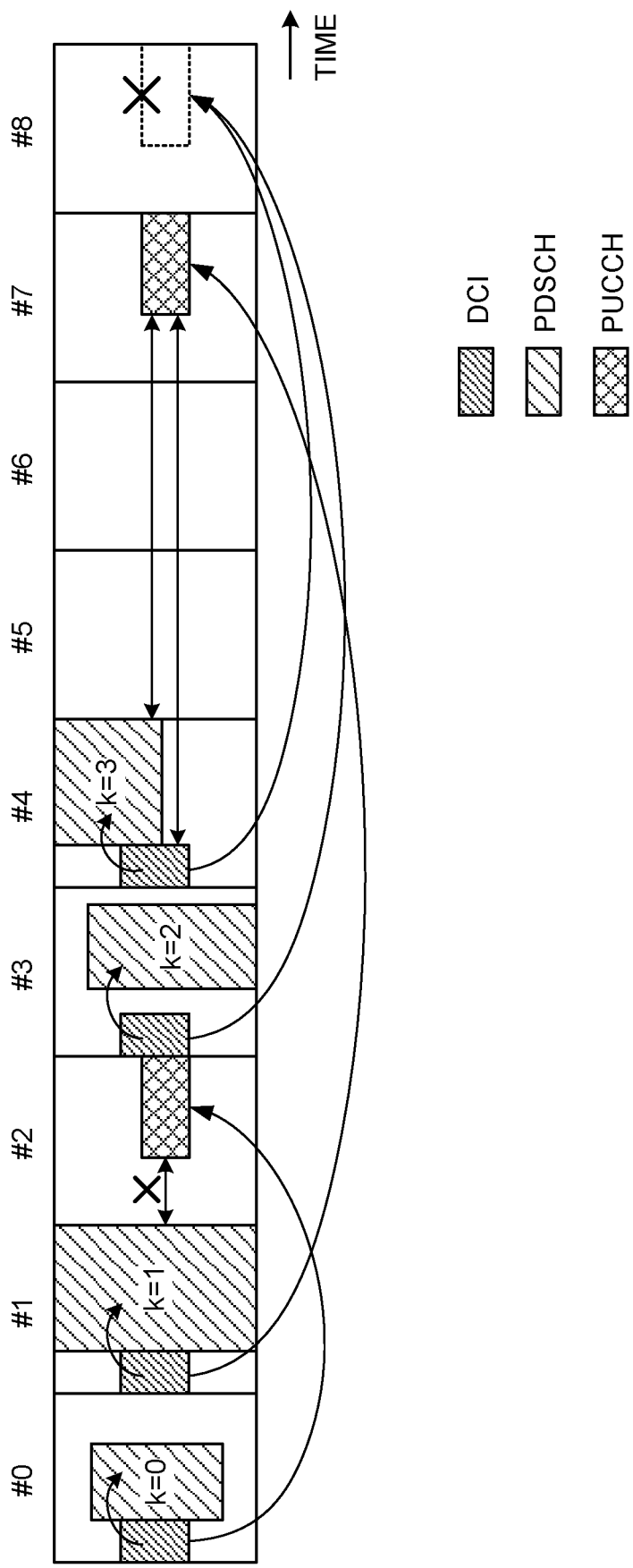
FIG. 10 is a diagram to show another example of the HARQ-ACK transmission according to the second aspect.

In a case that the UE transmits "ACK" as an HARQ-ACK using a PUCCH resource in a slot, the UE may control the HARQ-ACK transmission on the assumption of not transmitting the HARQ-ACK using PUCCH resources specified in subsequent slots (see FIG. 10).

For example, assume that in FIG. 10, the UE transmits NACK using the PUCCH resource in slot #2 and transmits ACK using the PUCCH resources in slot #7 and subsequent slots. In this case, the UE may control in such a way to not transmit an HARQ-ACK (ACK) using the PUCCH in slot #8 after transmitting ACK using the PUCCH resource in slot #7. This can reduce a UE transmission processing load.

However, the UE may control in such a way to transmit the HARQ-ACK for the PDSCH transmitted from the base station. For example, in FIG. 10, in a case that the HARQ-ACK(ACK) transmitted in slot #7 by the UE is not received on the base station side, the base station retransmits the PDSCH. For this reason, the UE may control in such a way to transmit the HARQ-ACK again for the PDSCH retransmitted from the base station. This allows retransmission control to be appropriated performed even in a case that reception is failed on the base station side.

(Radio Communication System)

Hereinafter, a structure of a radio communication system according to the present embodiment will be described. In this radio communication system, at least one combination of the above plurality of aspects is used to perform communication.

Figure 11:
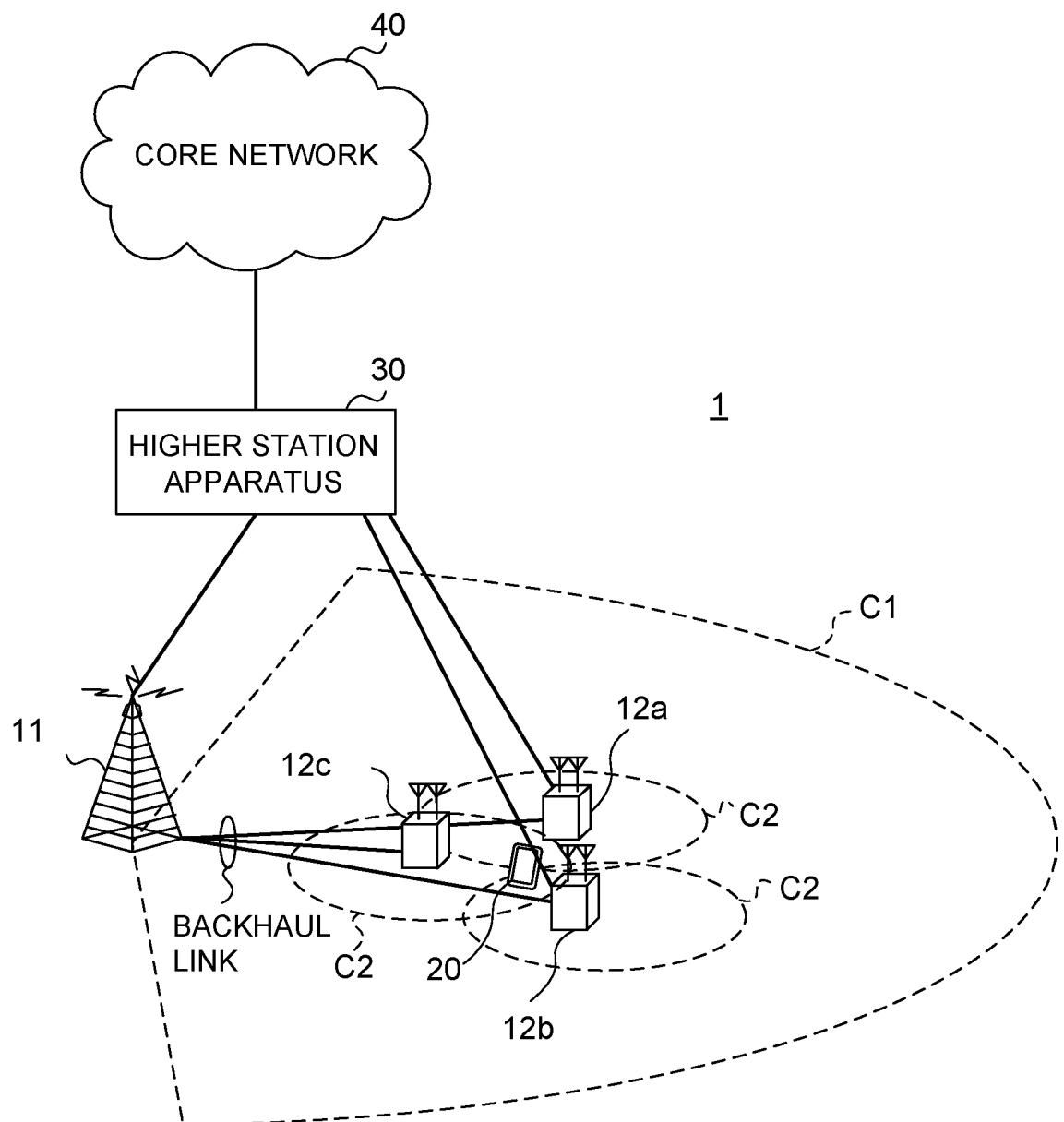
FIG. 11 is a diagram to show an example of a schematic structure of a radio communication system according to the present embodiment.

FIG. 11 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, filtering processing, windowing processing, and so on.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include at least one of downlink control channels (PDCCH (Physical Downlink Control Channel) and/or EPDCCH (Enhanced Physical Downlink Control Channel)), a PCFICH (Physical Control Format Indicator Channel), and a PHICH (Physical Hybrid-ARQ Indicator Channel). Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Acknowledgment information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio link quality information (CQI (Channel Quality Indicator)) of the downlink, acknowledgment information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 12:
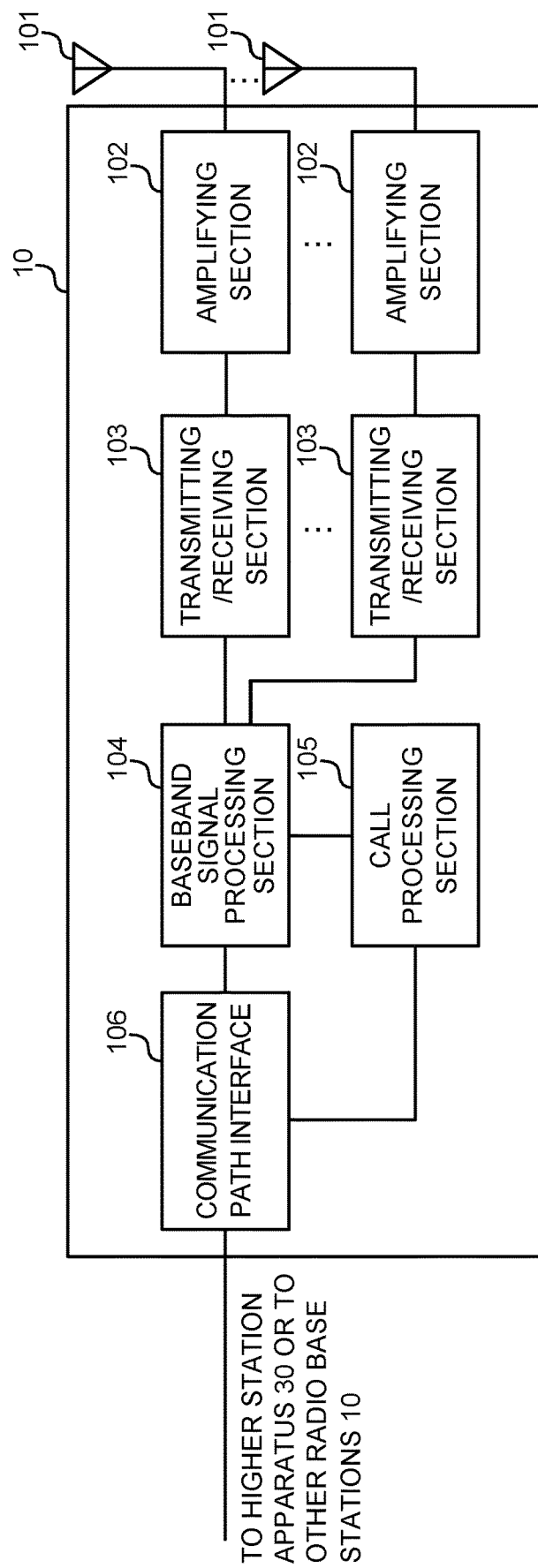
FIG. 12 is a diagram to show an example of an overall structure of a radio base station according to the present embodiment.

FIG. 12 is a diagram to show an example of an overall structure of the base station according to the present embodiment. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

Note that each transmitting/receiving section 103 may further include an analog beamforming section performing analog beamforming. The analog beamforming section can be constituted with an analog beamforming circuit (for example, a phase shifter, a phase shift circuit), or an analog beamforming apparatus (for example, a phase shift device) that can be described based on general understanding of the technical field to which the present invention pertains. The transmitting/receiving antennas 101 can be formed of an antenna array, for example. Each transmitting/receiving section 103 is configured to adopt a single BF and a multi BF.

The transmitting/receiving sections 103 transmit the downlink (DL) signals (including at least one of DL data signal (downlink shared channel), DL control signal (downlink control channel), and DL reference signal) to the user terminals 20, and receive the uplink (UL) signals (including at least one of UL data signal, UL control signal, and UL reference signal) from the user terminals 20.

The transmitting/receiving sections 103 use a plurality of slots to repeatedly transmit the downlink shared channel. The transmitting/receiving sections 103 may transmit a plurality of pieces of downlink control information that controls scheduling (or allocating) of the downlink shared channels repeatedly transmitted.

Figure 13:
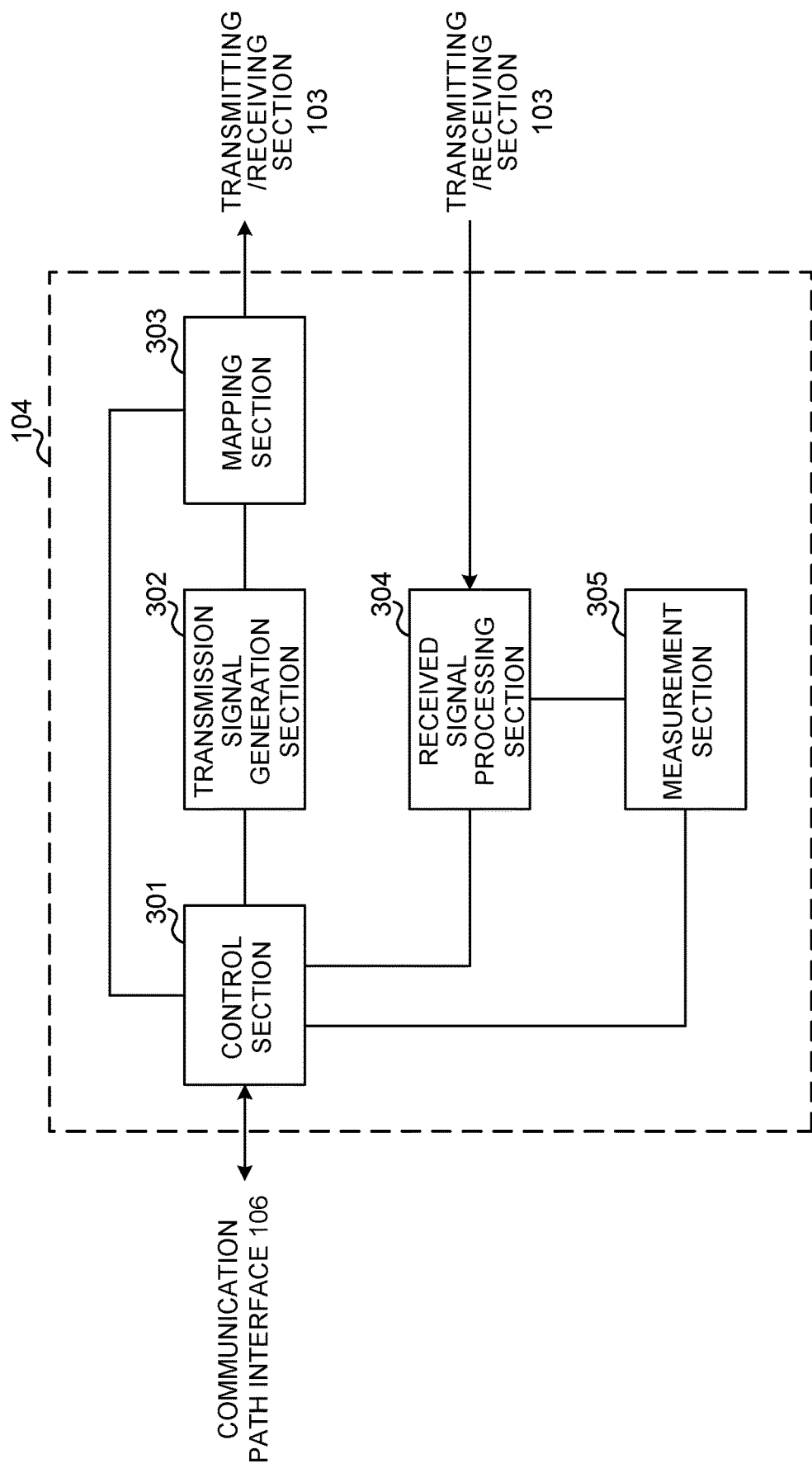
FIG. 13 is a diagram to show an example of a functional structure of the radio base station according to the present embodiment.

FIG. 13 is a diagram to show an example of a functional structure of the radio base station according to the present embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource allocation) of system information, a downlink data signal (for example, a signal transmitted on the PDSCH), a downlink control signal (for example, a signal transmitted on the PDCCH and/or the EPDCCH. Acknowledgment information, and so on). Based on the results of determining necessity or not of retransmission control to the uplink data signal, or the like, the control section 301 controls generation of a downlink control signal, a downlink data signal, and so on.

The control section 301 controls to schedule repetition transmission of the downlink shared channels transmitted in respective slots by use of a plurality of pieces of downlink control information.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can include a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing, modulation processing, and the like are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can include a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can include a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

<User Terminal>

Figure 14:
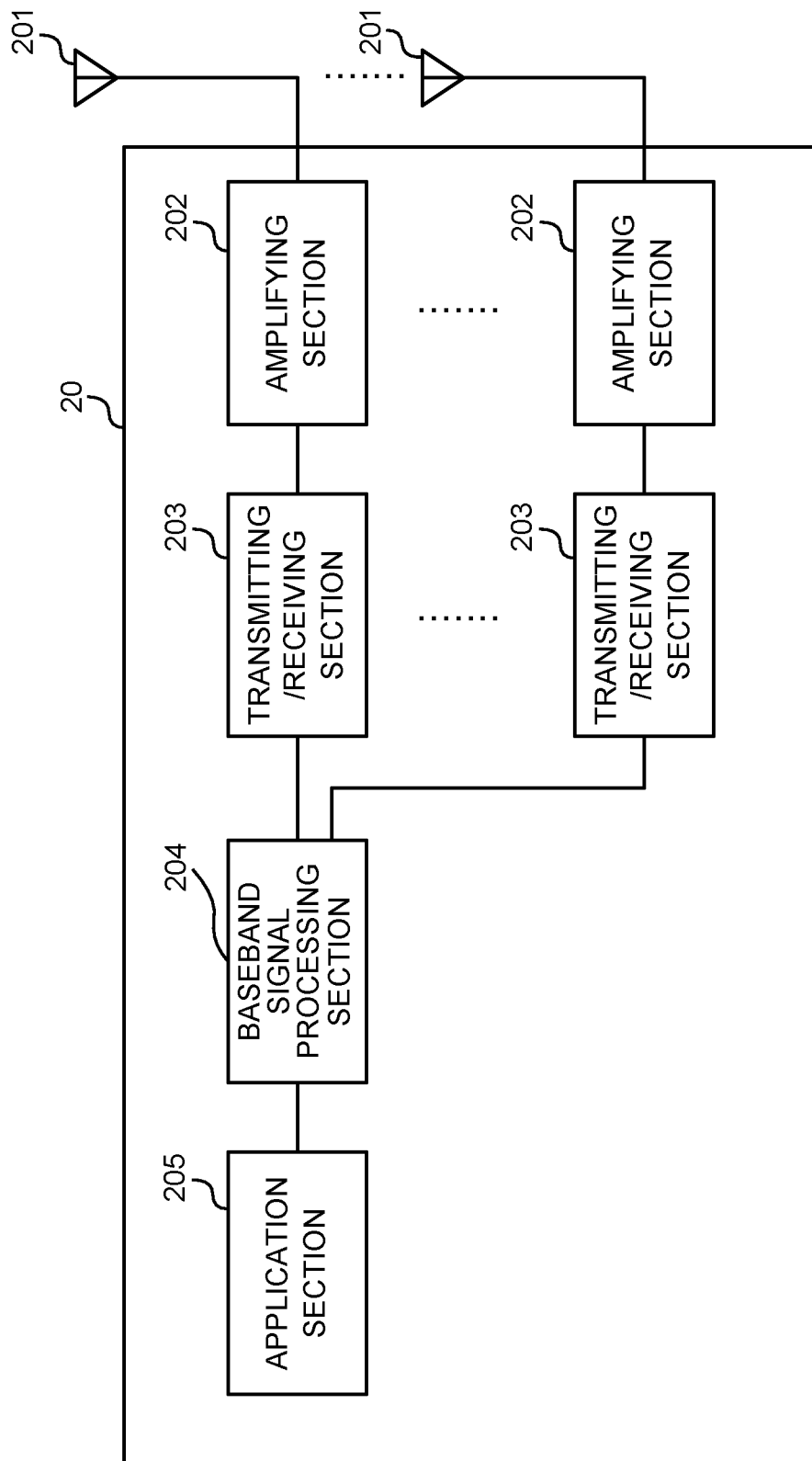
FIG. 14 is a diagram to show an example of an overall structure of a user terminal according to the present embodiment.

FIG. 14 is a diagram to show an example of an overall structure of the user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can include transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may include a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that each transmitting/receiving section 203 may further include an analog beamforming section performing analog beamforming. The analog beamforming section can be constituted with an analog beamforming circuit (for example, a phase shifter, a phase shift circuit), or an analog beamforming apparatus (for example, a phase shift device) that can be described based on general understanding of the technical field to which the present invention pertains. The transmitting/receiving antennas 201 can be formed of an antenna array, for example. Each transmitting/receiving section 203 is configured to adopt a single BF and a multi BF.

The transmitting/receiving sections 203 receive the downlink (DL) signals (including at least one of DL data signal (downlink shared channel), DL control signal (downlink control channel), and DL reference signal) from the radio base station 10, and transmit the uplink (UL) signals (including at least one of UL data signal, UL control signal, and UL reference signal) to the radio base station 10.

The transmitting/receiving sections 203 receive one or more pieces of downlink control information scheduling the downlink shared channels repeatedly transmitted and the PDSCHs repeatedly transmitted by use of a plurality of slots. In a case that transmissions of the downlink shared channels transmitted in the respective slots are controlled based on the different pieces of downlink control information, the transmitting/receiving sections 203 transmit acknowledgment signals for the downlink shared channels repeatedly transmitted, using a resource specified by at least one piece of downlink control information.

Figure 15:
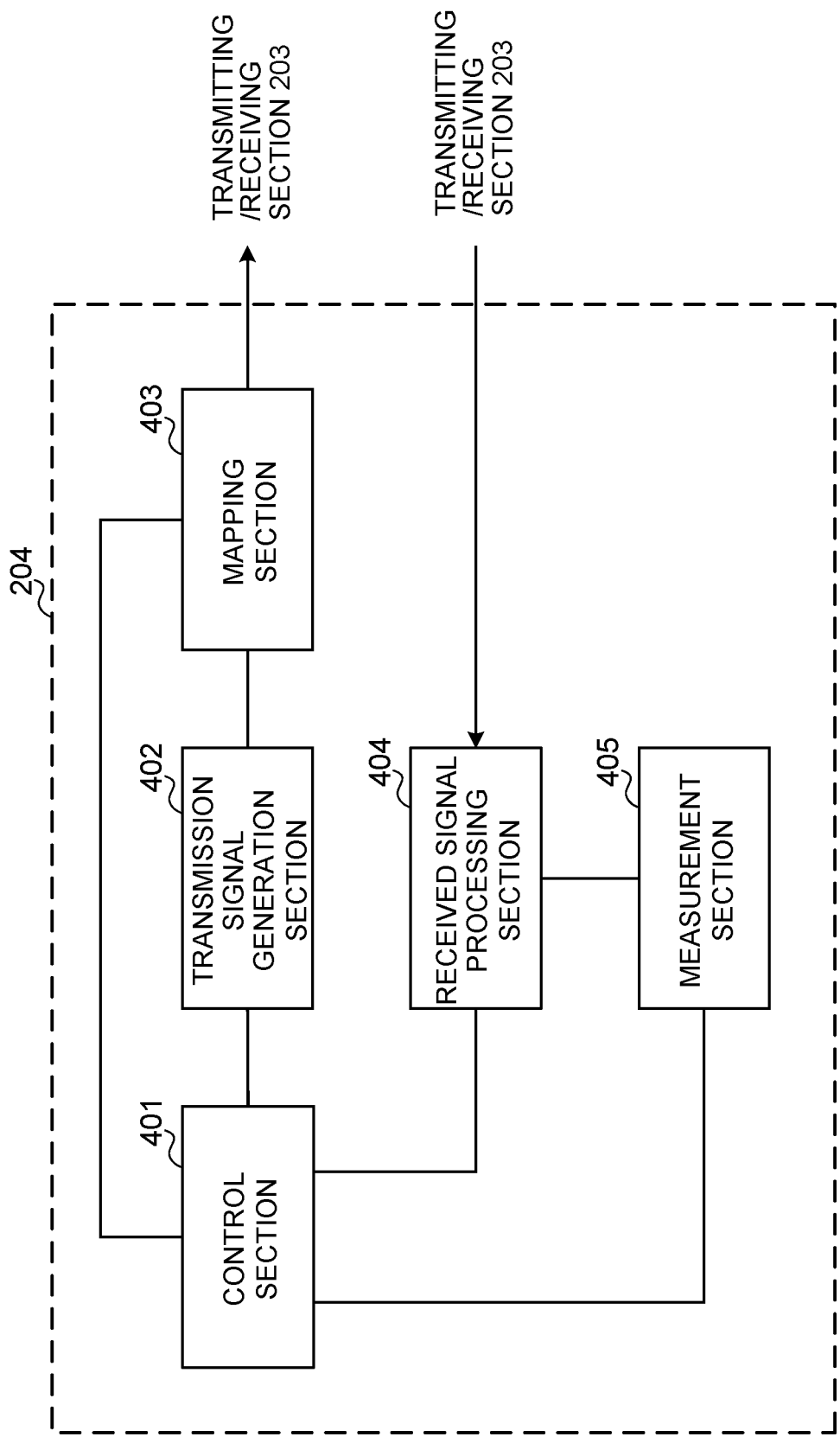
FIG. 15 is a diagram to show an example of a functional structure of the user terminal according to the present embodiment.

FIG. 15 is a diagram to show an example of a functional structure of the user terminal according to the present embodiment. Note that, this example primarily shows functional blocks that pertain to characteristic parts of the present embodiment, and it may be assumed that the user terminal 20 includes other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can include a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

In a case that transmissions of the downlink shared channels transmitted in the respective slots are controlled based on the different pieces of downlink control information, the control section 401 controls transmissions of acknowledgment signals for the downlink shared channels repeatedly transmitted using resources specified by at least one piece of downlink control information.

For example, the control section 401 may aggregate and transmit acknowledgment signals for the downlink shared channels repeatedly transmitted, using a resource specified by certain downlink control information that is transmitted last in the time direction among a plurality of pieces of downlink control information controlling the transmissions of the downlink shared channels transmitted in the respective slots.

In a case that the control section 401 transmits acknowledgment signals for the downlink shared channels repeatedly transmitted, using resources specified by the downlink control information corresponding to the downlink shared channels transmitted in the respective slots, the control section 401 may make contents of the acknowledgment signals to transmit using the different resources be the same (for example, one of ACK and NACK).

The control section 401 may assume that at least a certain period is configured between a downlink shared channel or downlink control information that is transmitted last among the downlink shared channels repeatedly transmitted and the resources for acknowledgment signals for the downlink shared channels repeatedly transmitted.

In the case that the control section 401 transmits acknowledgment signals for the downlink shared channels repeatedly transmitted, using resources specified by the downlink control information corresponding to the downlink shared channels transmitted in the respective slots, the control section 401 may independently configure the contents of the acknowledgment signals to transmit using the different resources.

In a case that a plurality of resources different in the time domain are configured by the downlink control information corresponding to the downlink shared channels transmitted in the respective slots, the control section 401 may control in such a way as not to transmit an acknowledgment signal using a resource that is after transmitting ACK as an acknowledgment signal.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about acknowledgment information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include determination, decision, judgment, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 16:
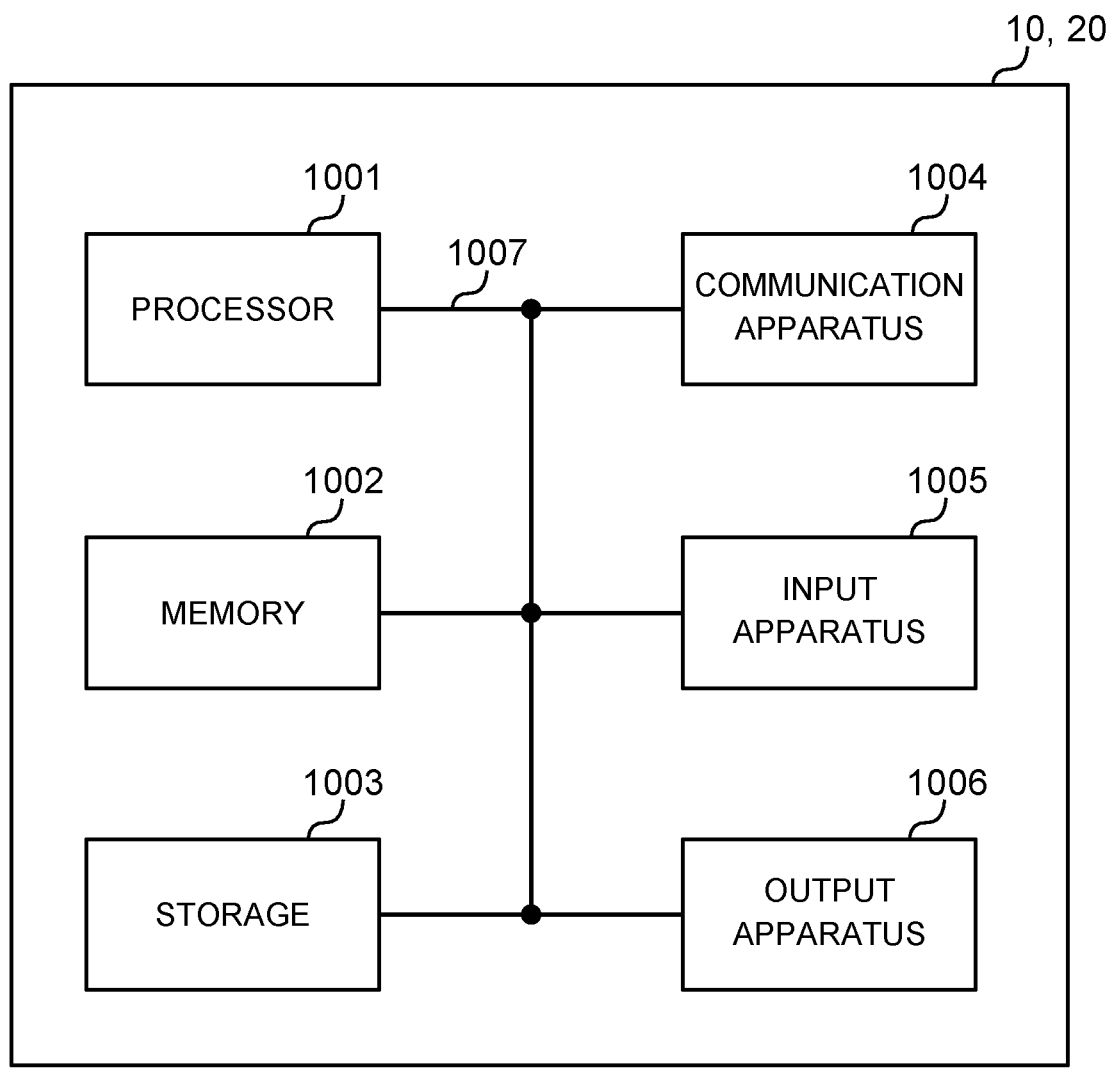
FIG. 16 is a diagram to show an example of a hardware structure of the radio base station and the user terminal according to the present embodiment.

For example, a base station, a user terminal, and so on according to one embodiment of the present disclosure may function as a computer that executes the processes of the radio communication method of the present disclosure. FIG. 16 is a diagram to show an example of a hardware structure of the base station and the user terminal according to one embodiment. Physically, the above-described base station 10 and user terminal 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004. In the transmitting/receiving section 103, the transmitting section 103*a* and the receiving section 103*b* can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, "channels" and "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "usual TTI" (TTI in LTE Rel. 8 to Rel. 12), a "normal TTI," a "long TTI," a "usual subframe," a "normal subframe," a "long subframe," a "slot" and so on. A TTI that is shorter than a usual TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a usual TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input/output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by 1-bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure may be used interchangeably.

In the present disclosure, the terms such as "precoding," a "precoder," a "weight (precoding weight)," "Quasi-Co-Location (QCL)," a "transmit power," a "phase rotation," an "antenna port," an "antenna port group," a "layer," "the number of layers," a "rank," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, next-generation systems that are enhanced based on these, and the like. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "determining (deciding)" as in the present disclosure herein may encompass a wide variety of actions. For example, "determining (deciding)" may be interpreted to mean making "determinations (decisions)" about judging, calculating, computing, processing, deriving, investigating, looking up, search and inquiry (for example, searching a table, a database, or some other data structures), ascertaining, and so on.

Furthermore, "determining (deciding)" may be interpreted to mean making "determinations (decisions)" about receiving (for example, receiving information), transmitting (for example, transmitting information), input, output, accessing (for example, accessing data in a memory), and so on.

In addition, "determining (deciding)" as used herein may be interpreted to mean making "determinations (decisions)" about resolving, selecting, choosing, establishing, comparing, and so on. In other words, "determining (deciding)" may be interpreted to mean making "determinations (decisions)" about some action.

In addition, "determining (deciding)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections or the like, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives downlink shared channels repeatedly transmitted by use of a plurality of slots; and
   a processor that, in a case that transmissions of the downlink shared channels transmitted in the respective slots are controlled based on a plurality of downlink control information transmitted on different downlink control channel candidates, controls transmissions of acknowledgment signals for the downlink shared channels repeatedly transmitted, using a resource specified by downlink control information transmitted on at least one downlink control channel candidate,
   wherein the processor transmits acknowledgment signals, for the downlink shared channels that are repeatedly transmitted, in one slot using a resource specified by certain downlink control information of the downlink control channel candidate, the certain downlink control information being transmitted last in a time direction among the plurality of downlink control information transmitted on the different downlink control channel candidates, controlling the transmissions of the downlink shared channels transmitted in the respective slots.

2. A radio communication method for a terminal comprising:
   receiving downlink shared channels repeatedly transmitted by use of a plurality of slots; and
   in a case that transmissions of the downlink shared channels transmitted in the respective slots are controlled based on a plurality of downlink control information transmitted on different downlink control channel candidates, controlling transmissions of acknowledgment signals for the downlink shared channels repeatedly transmitted, using a resource specified by downlink control information transmitted on at least one downlink control channel candidate,
   wherein acknowledgment signals, for the downlink shared channels that are repeatedly transmitted, are transmitted in one slot using a resource specified by certain downlink control information of the downlink control channel candidate, the certain downlink control information being transmitted last in a time direction among the plurality of downlink control information transmitted on the different downlink control channel candidates, controlling the transmissions of the downlink shared channels transmitted in the respective slots.

3. A system comprising a terminal and a base station, wherein:
   the terminal comprises:
      a receiver that receives downlink shared channels repeatedly transmitted by use of a plurality of slots; and
      a processor that, in a case that transmissions of the downlink shared channels transmitted in the respective slots are controlled based on a plurality of downlink control information transmitted on different downlink control channel candidates, controls transmissions of acknowledgment signals for the downlink shared channels repeatedly transmitted, using a resource specified by downlink control information transmitted on at least one downlink control channel candidate,
      wherein the processor transmits acknowledgment signals, for the downlink shared channels that are repeatedly transmitted, in one slot using a resource specified by certain downlink control information of the downlink control channel candidate, the certain downlink control information being transmitted last in a time direction among the plurality of downlink control information transmitted on the different downlink control channel candidates, controlling the transmissions of the downlink shared channels transmitted in the respective slots, and
   the base station comprises:
      a transmitter that repeatedly transmits a downlink shared channel using the plurality of slots.

* * * * *